United States Patent [19]

Gelman et al.

[11] Patent Number: 5,555,378
[45] Date of Patent: Sep. 10, 1996

[54] SCHEDULING TRANSMISSION MULTIMEDIA INFORMATION IN BROADBAND NETWORKS USING A TOKEN PASSING SCHEME

[75] Inventors: Alexander Gelman, Brooklyn, N.Y.; Shlomo Halfin, Chatham, N.J.

[73] Assignee: Bell Communications Research, Inc., Morristown, N.J.

[21] Appl. No.: 206,777

[22] Filed: Mar. 2, 1994

[51] Int. Cl.⁶ .................................................. H01J 13/00
[52] U.S. Cl. ........................... 395/200.13; 395/200.08; 395/849; 395/873; 395/477; 364/232.22
[58] Field of Search .............................. 395/200, 200.13, 395/200.08, 849, 873, 477; 364/232.22

[56] References Cited

U.S. PATENT DOCUMENTS

| | | | |
|---|---|---|---|
| 4,621,359 | 11/1986 | McMillen | 370/60 |
| 4,933,936 | 6/1990 | Rasmussen et al. | 370/85.9 |
| 5,208,665 | 5/1993 | McCalley et al. | 348/12 |
| 5,235,595 | 8/1993 | O'Dowd | 370/94.1 |
| 5,285,272 | 2/1994 | Bradley et al. | 348/6 |
| 5,319,455 | 6/1994 | Hoarty et al. | 348/7 |
| 5,341,474 | 8/1994 | Gelman et al. | 395/200 |
| 5,361,091 | 11/1994 | Hoarty et al. | 348/7 |
| 5,371,532 | 12/1994 | Gelman et al. | 348/7 |
| 5,404,446 | 4/1995 | Bowater et al. | 395/162 |
| 5,408,465 | 4/1995 | Gusella et al. | 370/17 |
| 5,414,455 | 5/1995 | Hooper et al. | 348/7 |

OTHER PUBLICATIONS

Gelman et al, "A Store-and-Forward Architecture for Video-on-Demand Service" IEEE Int'l Conference, (1991), (P842–846).

A. Gelman, S. Halfin & W. Willinger, "On Buffer Requirements for Store and Forward Video on Demand Service Circuits," IEEE Global Telecommunications Conference, (1991), (pp. 976–980).

Primary Examiner—Alyssa H. Bowler
Assistant Examiner—Robert E. Stachler, II
Attorney, Agent, or Firm—Leonard Charles Suchyta; James W. Falk

[57] ABSTRACT

A scheduling system and method, which employ a token passing scheme, for scheduling transmission of multimedia information between information warehouses (IWHs) and CO clusters (CCs) interconnected by ATM switch(es). Each CO cluster employs a CC schedule processor, which has means for receiving and means for storing requests for multimedia information, means for sorting and prioritizing the requests, means for forwarding requests to appropriate IWHs, and means for accepting or rejecting tokens offered by IWHs in response to a request. The IWH employs an IWH schedule processor which includes means for receiving and means for storing requests from CO clusters, means for selecting a request and generating a token to be sent to the CO cluster originating the request, and means for storing a list of CO cluster rejecting tokens. Requests received from multiple subscribers are stored, sorted, and prioritized at CC schedule processors, which forward the requests to appropriate IWHs. The schedule processor of each IWH receives and stores requests from CO clusters, selects a request to be serviced based on a first distance function and issues a token to the CO cluster originating the selected request. The CC schedule processor of each CO cluster selects a token to be accepted based upon a second distance function, and the requested multimedia information is transmitted from the IWH issuing the token to the CO cluster. Other tokens are rejected and returned to the issuing IWH. Each IWH may maintain a list of CO cluster rejecting its issued tokens.

6 Claims, 16 Drawing Sheets

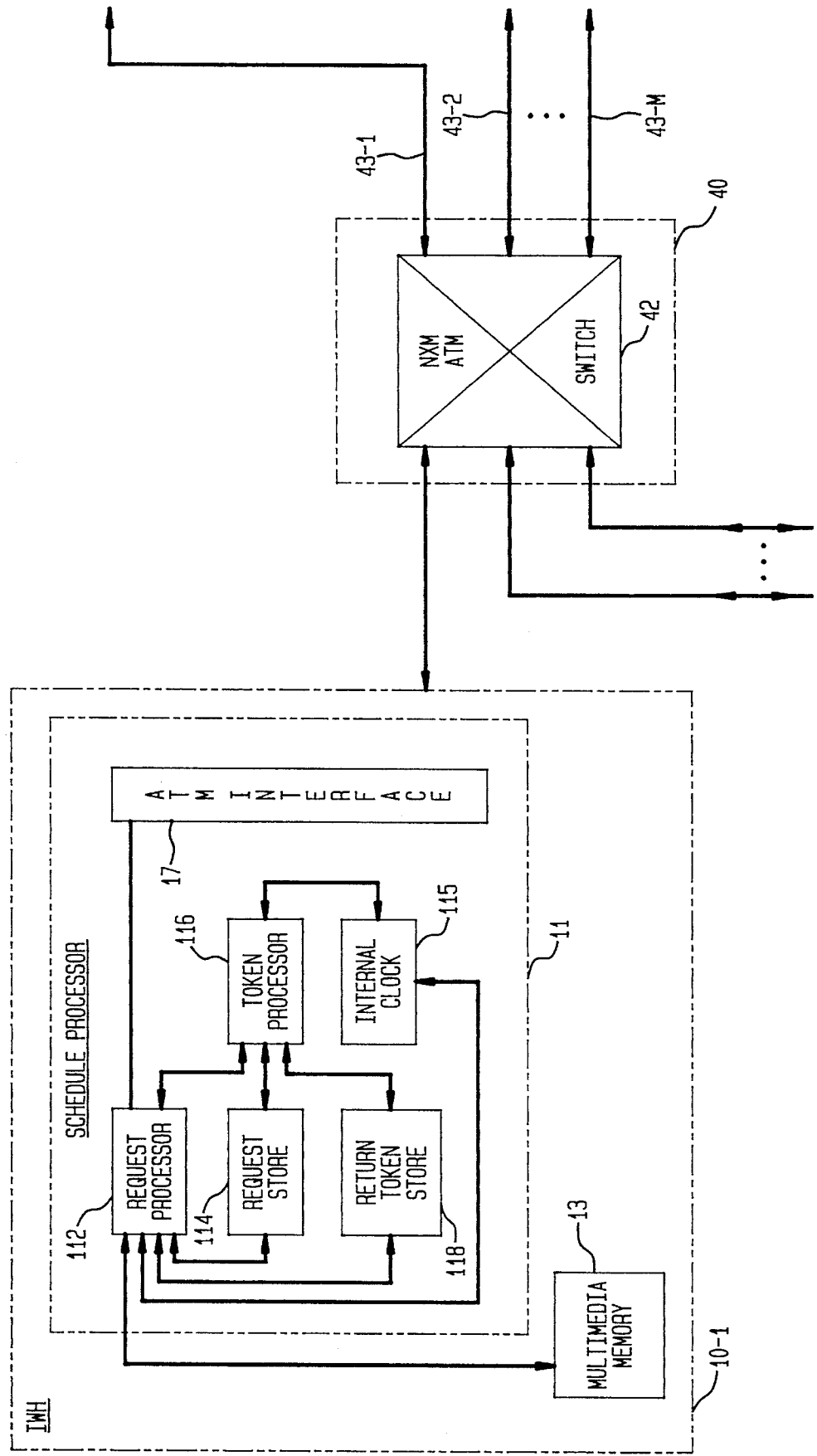

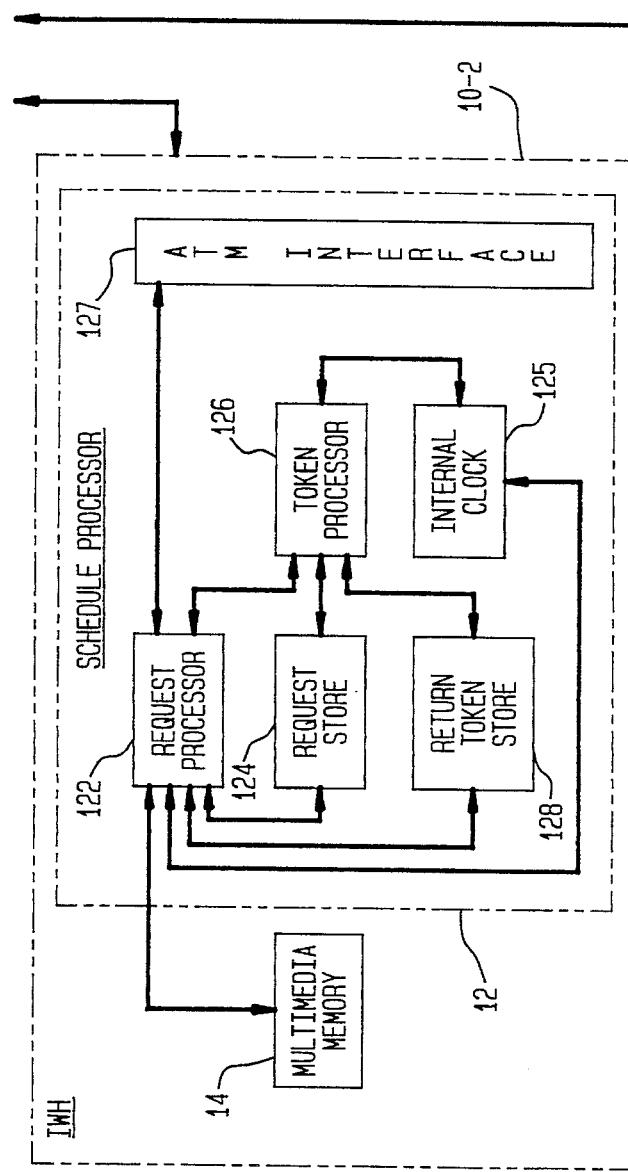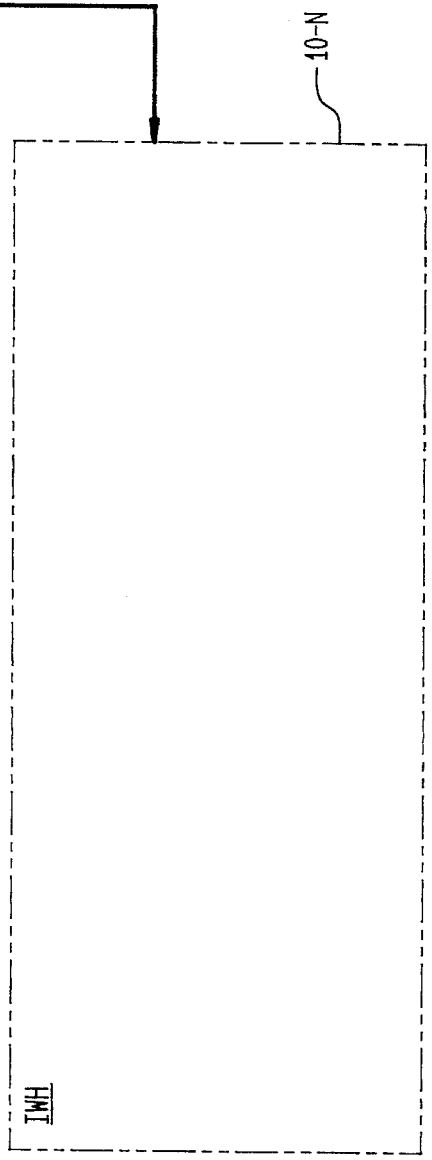

FIG. 8A

| i | CB($r_i$) | RT($r_i$) | IWH($r_i$) |
|---|---|---|---|
| 1 | 51-1 | $2TR_0$ | 10-1 |
| 2 | 51-2 | $TR_0$ | 10-2 |
| 3 | 51-L | $TR_0$ | 10-1 |

REQUESTS ($r_i$) AT CC 41-1

FIG. 8B

| i | CB($r_i$) | RT($r_i$) | IWH($r_i$) |
|---|---|---|---|
| 4 | 52-1 | $2TR_0$ | 10-2 |
| 5 | 52-2 | $2TR_0$ | 10-1 |

REQUESTS ($r_i$) AT CC 41-2

FIG. 10A

REQUESTS ($r_i$) AT IWH 10-1

| i | CC($r_i$) | RT($r_i$) | $t_{CC-ET}$ |
|---|---|---|---|
| 3 | 41-1 | $TR_0$ | 2T |
| 5 | 41-2 | $2TR_0$ | 2T |

FIG. 10B

REQUESTS ($r_i$) AT IWH 10-2

| i | CC($r_i$) | RT($r_i$) | $t_{CC-ET}$ |
|---|---|---|---|
| 2 | 41-1 | $TR_0$ | 2T |
| 4 | 41-2 | $2TR_0$ | 2T |

FIG. 10C

DISTANCE FUNCTION ($r_i$) AT IWH 10-1

| i | $t_{IWH-ET}$ | $D_{IWH}(r_i)$ |
|---|---|---|
| 3 | 3T | 2T |
| 5 | 3T | 3T |

FIG. 10D

DISTANCE FUNCTION ($r_i$) AT IWH 10-2

| i | $t_{IWH-ET}$ | $D_{IWH}(r_i)$ |
|---|---|---|
| 2 | 4T | 3T |
| 4 | 4T | 4T |

FIG. 10E

| DISTANCE FUNCTION ($r_i$) AT IWH 10-1 ||
|---|---|
| i | $t_{IWH-ET}$ |
| 5 | 8T |

FIG. 10F

| DISTANCE FUNCTION ($r_i$) AT IWH 10-2 |||
|---|---|---|
| i | $t_{IWH-ET}$ | $D_{IWH}(r_i)$ |
| 2 | 5T | 4T |
| 4 | 5T | 5T |

FIG. 11A

| i | TOKEN | $t_{IWH-ET}$ | $RT(r_i)$ | $D_{CC}(r_i)$ |
|---|---|---|---|---|
| \multicolumn{5}{c}{DISTANCE FUNCTION $(r_i)$ AT CC 41-1} |
| 3 | A-1 | 3T | $TR_0$ | 4T |
| 2 | B-1 | 4T | $TR_0$ | 5T |

FIG. 11B

| i | TOKEN | $t_{IWH-ET}$ | $RT(r_i)$ | $D_{CC}(r_i)$ |
|---|---|---|---|---|
| \multicolumn{5}{c}{DISTANCE FUNCTION $(r_i)$ AT CC 41-2} |
| 4 | B-2 | 5T | $2TR_0$ | 7T |
| 5 | A-2 | 8T | $2TR_0$ | 10T |

SCHEDULING TRANSMISSION MULTIMEDIA INFORMATION IN BROADBAND NETWORKS USING A TOKEN PASSING SCHEME

RELATED APPLICATION

U.S. patent applications Ser. No. 07/884,516, entitled "Communications Architecture and Method of Distributing Information Services" now U.S. Pat. No. 5,371,532, issued Dec. 6, 1994, and Ser. No. 07/884,515, entitled "Communications Architecture and Buffer for Distributing Information Services," now U.S. Pat. No. 5,341,474 issued Aug. 23, 1994, both filed on May 15, 1992, for A. D. Gehnan, H. Kobrinski, L. S. Smoot, and S. B. Weinstein, and assigned to Bell Communications Research Inc., contain subject matter related to that of the present application, and are hereby incorporated by reference.

FIELD OF INVENTION

This invention relates to a communications network, such as a broadband network, and specifically, a system and method for scheduling the transmission of multimedia information in a broadband network.

BACKGROUND OF THE INVENTION

U.S. applications Ser. Nos. 07/884,516 and 07/884,515, which are herein incorporated by reference, describe communications networks for providing multimedia information, such as information programs, to subscribers on demand. To support near term deployment of these communications networks, early stages of the broadband integrated services digital network (BISDN), which employs Asynchronous Transfer Mode (ATM) and Synchronous Optical Network (SONET), have been used as the network backbone. The early stages of BISDN are characterized as supporting high bandwidth and permanent virtual connections which may be eventually replaced by switched virtual connections. It is envisioned that early stages of BISDN will support communication systems transporting multimedia information, which is characterized by bursty communications with large packet sizes and task response requirements.

Under ATM techniques, data is routed from point-to-point between network nodes in self-contained, fixed-length packets of data called cells. The standard cell for broadband transmission systems has been defined by the International Consultative Committee for Telephony and Telecommunications (CCITT) to be 53 octets in length with five octets dedicated to header information. The basic SONET transmission rate, referred to as the STS-1 rate, is defined to be 51.84 Mb/s. Other rates in the hierarchy are defined as STS-N, where N is the whole number multiplier of the STS-1 rate. For example, STS-3 would be equal to 155.52 Mb/s.

FIG. 1 depicts a known communications network 100 which employs BISDN for providing interconnectivity between network nodes. These nodes include a plurality of Information Warehouses (IWHs) 10, a plurality of Central Offices (COs) 40, and a plurality of customer premises equipments (CPEs) 70. Each IWH 10 may be connected to multiple COs 40 via high speed trunks 90 operating at standard broadband rates. These trunks 90 operate at transmission rates which are part of a hierarchy of digital rates, each being a multiple of the basic SONET transmission rate. Multiple COs are also interconnected by high speed trunks 90. Each CO 40 serves multiple CO clusters (CC), each of which is connected to multiple CPEs 70 via transmission links 91 operating bidirectionally at low-speed rates, such as 1.5 Mb/s downstream and a few kilobits/second upstream.

The IWHs archive multimedia and related information and dispense this information to COs as requested. In addition to the functions conventionally provided at COs in broadband networks, COs also manage subscribers' requests for multimedia information, request segments of multimedia from appropriate IWHs, and buffer the segments once received from the IWHs for play-out to requesting subscribers. Each CO also employs ATM switching equipment 42 which routes cells between the CO and destinations in the broadband network. The ATM equipment includes a switch which interconnects each CO cluster to the remainder of the communications network. It is thus possible to send bursts of high-speed digital information between COs and between COs and IWHs.

The CPE is the subscriber's interface to communications network. At the CPE, a subscriber places a request for multimedia information, and once the requested information is received, the CPE presents the information to the subscriber.

FIG. 2 depicts a simplified communications network 300 including a plurality of IWHs 10-1 through 10-N, a CO 40 which includes an ATM switch 42 and M CO clusters 41-1 through 41-M, and CPEs 71-1 through 71-L to illustrate the network operation for providing multimedia information to subscribers. Subscribers place a request for interactive multimedia and also control the play-out of multimedia by interacting with their CPEs, which forward requests to the CO clusters. The CO clusters simultaneously receives multiple requests from CPEs. At each CO, these requests are processed and further requests are sent to appropriate IWHs for information to fulfill subscribers' information needs. To deliver each request to the appropriate IWHs, connections are established between each CO cluster and each IWH archiving requested information via the ATM switch. Therefore, multiple CO clusters could simultaneously send requests in the form of ATM packets to the same IWH. IWHs respond to these requests by sending the requested information to the requesting CO clusters via the ATM switch. Therefore, multiple IWHs may concurrently transmit information to the same CO cluster.

The main problem with this network configuration is that collisions at ATM switch output ports connected to the CO clusters may occur between packets being delivered from multiple IWHs for multiple CPEs located at the same cluster of the CO. For example, assume that IWHs 10-1, 10-2, and 10-N desire to send information to CPEs 71-1, 71-2, and 71-3, respectively, at substantially the same time, which CPEs are connected to CO cluster 41-1 via output port 43-1 of the ATM switch 42. The ATM switch would likely establish connections in rapid succession between each of the IWHs and the CO cluster 41-1 to transmit the requested information. But, generally ATM switches are not designed to buffer large numbers of cells. Furthermore, ATM switches provide no signalling or other intelligence between IWHs and CO clusters for communicating whether the available buffer capacity at the output port of the switch can accommodate the information to be sent from the IWH to the CO cluster. Therefore, the transmission of data from IWHs 10-1, 10-2, and 10-N to the CO cluster 41-1 in rapid succession could result in buffer overflow at output port 43-1 of the ATM switch 42 and information being lost.

In communications networks which deliver interactive multimedia information in real time, uninterrupted information delivery is key, and, therefore, a significant loss of information at an ATM switch output port connecting to a CO cluster cannot be tolerated. Requests received by the IWHs are task oriented and thus require the delivery of the requested information within a specified period of time to ensure uninterrupted service to subscribers. To support the near term delivery of multimedia information consistent with the present and evolving public switched network, it is advantageous to build the communications network utilizing BISDN, the network of the future, as the network backbone, despite the collision problems and shortcomings of the ATM switch. Therefore, an object of our invention is a system and method for interactively delivering multimedia information in real time from IWHs to CO clusters via an ATM switch and for avoiding collisions at the output ports of the ATM switch such that uninterrupted information delivery can be provided. A further objective of our invention is a system and method for scheduling transmission of multimedia information in real-time between nodes of an ATM switch to avoid collisions at the output of the ATM switch.

SUMMARY OF THE INVENTION

An aspect of our invention is a system and method for scheduling transmission of multimedia information between nodes interconnected by an ATM switch. Specifically, our inventive system and method schedule transmission between IWHs and CO clusters interconnected by an ATM switch such that collisions at the ATM switch are avoided and multimedia information requested from IWHs is received at the requesting CO clusters in a timely manner.

Our scheduling system is distributed, having components located at the CO clusters and the IWHs, and employs a token passing scheme. Specifically, each CO cluster (CC) includes a CC schedule processor, which receives and stores requests for multimedia information from CO buffers. Each request is accompanied by a required response time which is the time by which a response to the request is due. The CC schedule processor also sorts the requests according to the IWH to service the requests, prioritizes the sorted requests based on response time, and forwards the requests to appropriate IWHs. Each IWH includes an IWH schedule processor, which receives and stores requests from CO clusters via the ATM switch. Since the output buffers of the ATM switch to the CO clusters are relatively small, only one IWH can respond to a request from any CO cluster at any one time. Otherwise, buffer collisions and overflow are imminent. Thus, scheduling transmissions from IWHs to CO clusters is necessary to prevent collisions at the output buffers of the ATM switch. It is also advantageous to schedule transmission between IWHs and CO clusters such that high throughput is maintained and the number of missed response times is minimized.

Accordingly, the IWH schedule processor selects a request from among the stored requests to be serviced based on an IWH distance function ($D_{IWH}$), which is designed to minimize idle time and missed response times. On selecting a request, the IWH schedule processor issues a token to the CO cluster which sent the selected request. The token represents an offer from the IWH to send the requested multimedia information to the CO cluster after a particular time.

On receiving tokens from IWHs, the schedule processor of the CO cluster considers which token should be accepted and which should be rejected by applying a CO cluster distance function ($D_{CC}$). On selecting a token, the CC schedule processor forwards a message to the IWH issuing the selected token advising the IWH of its acceptance. The IWH schedule processor subsequently retrieves the requested multimedia information from memory and forwards it to the CO cluster. The CO cluster then forwards the multimedia information to the CO buffer originating the request. Rejected tokens are returned to their issuing IWHs. At an IWH receiving a returned token, the IWH schedule processor may cause a list of rejecting CO clusters to be held in storage to prevent tokens from being issued to unavailable or disinterested CO clusters.

Once the token offered by an IWH has been accepted and transmission of the requested information has been scheduled or once the offered token is returned to an IWH, the IWH is free to issue another token based on its selection of another request to be serviced. In selecting another request the IWH may exclude from consideration those requests transmitted from any CO cluster listed as a rejecting CO cluster.

BRIEF DESCRIPTION OF THE DRAWING

FIG. 3 indicates, in accordance with an illustrative embodiment of our invention, the manner in which FIGS. 4–7, discussed infra, may be arranged to disclose a communication network employing our scheduling system and method.

FIGS. 6 and 7 depict schematic diagrams of schedule processors at IWHs, in accordance with an illustrative embodiment of our invention.

FIGS. 8(a) and 8(b) display, in tabular form, requests and associated information held at the request stores of CO clusters, in accordance with an illustrative example of our invention.

FIGS. 10(a) and 10(b) display, in tabular form, requests and associated information held at the request stores of IWHs, in accordance with an illustrative example of our invention.

FIGS. 10(c) through 10(f) display, in tabular form, distances computed for requests held in request stores at IWHs, in accordance with an illustrative example of our invention.

FIGS. 11(a) and 11(b) display, in tabular form, distances computed for requests held in request stores at CO clusters, in accordance with an illustrative example of our invention.

The organization and operation of the invention will be better understood from a consideration of the detailed description of the illustrative embodiments thereof, which follow, when taken in conjunction with the accompanying drawing.

DETAILED DESCRIPTION OF THE INVENTION

An aspect of our invention is a system and method for scheduling transmission of multimedia information between IWHs and CO clusters interconnected by an ATM switch. For illustrative purposes, the communications network 400, in which our inventive system and method can be employed, is shown in FIG. 3 which is a combination of FIGS. 4–7, discussed infra. A plurality of IWHs 10-1 through 10-N are interconnected to a CO 40 via an N×M ATM switch 42 (See FIGS. 4–7). The CO 40 serves M CO clusters 41-1 through 41-M, each CO cluster being connected to an output port of the ATM switch. Specifically, CO cluster 41-1 is connected to output port 43-1 and CO cluster 41-M is connected to output port 43-M. The IWHs can be similarly interconnected to other COs via other ATM switches, or a cascade of ATM switches (See FIG. 14).

Figure 4:
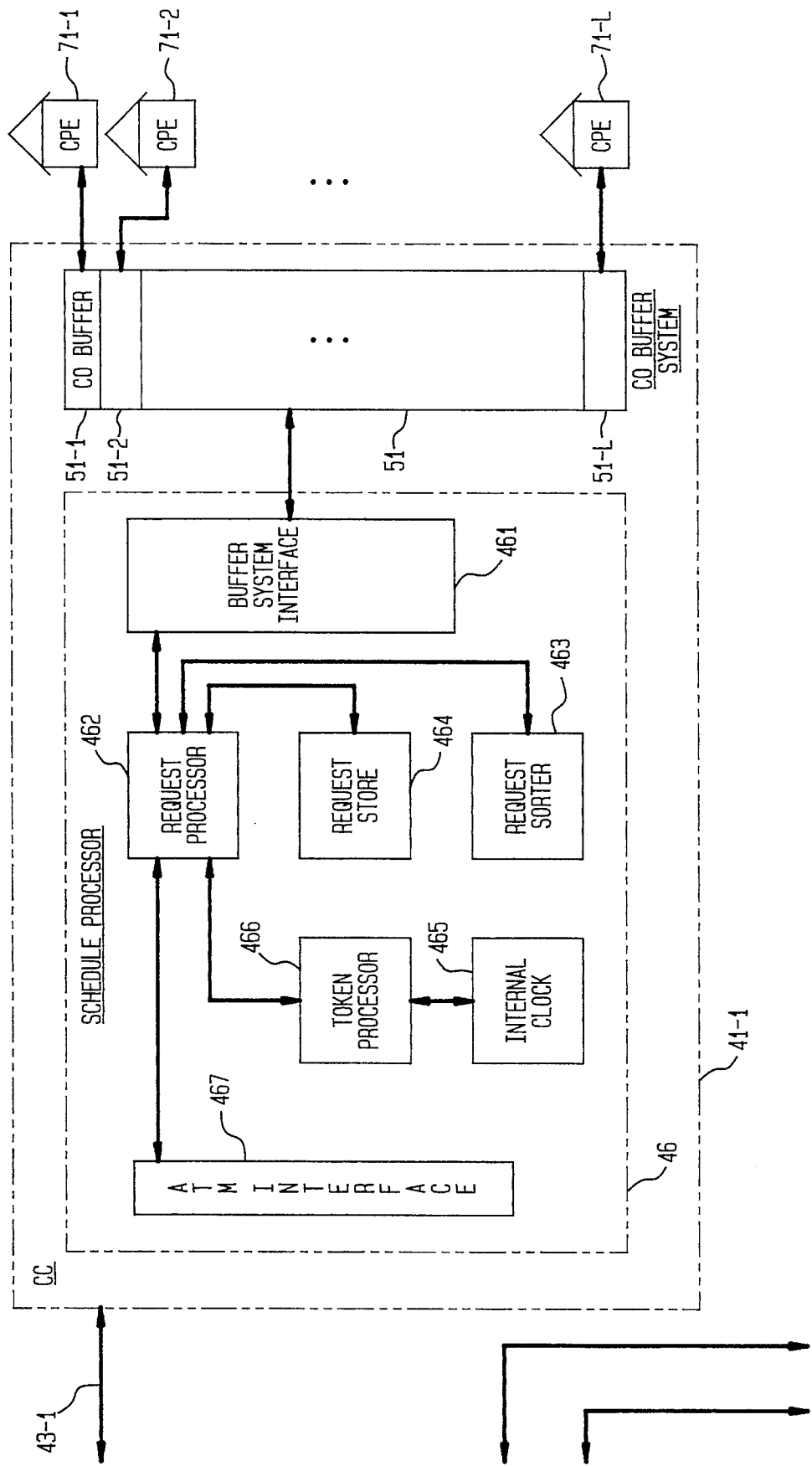
FIGS. 4 and 5 depict schematic diagrams of schedule processors at CO clusters, in accordance with an illustrative embodiment of our invention.
Figure 5:
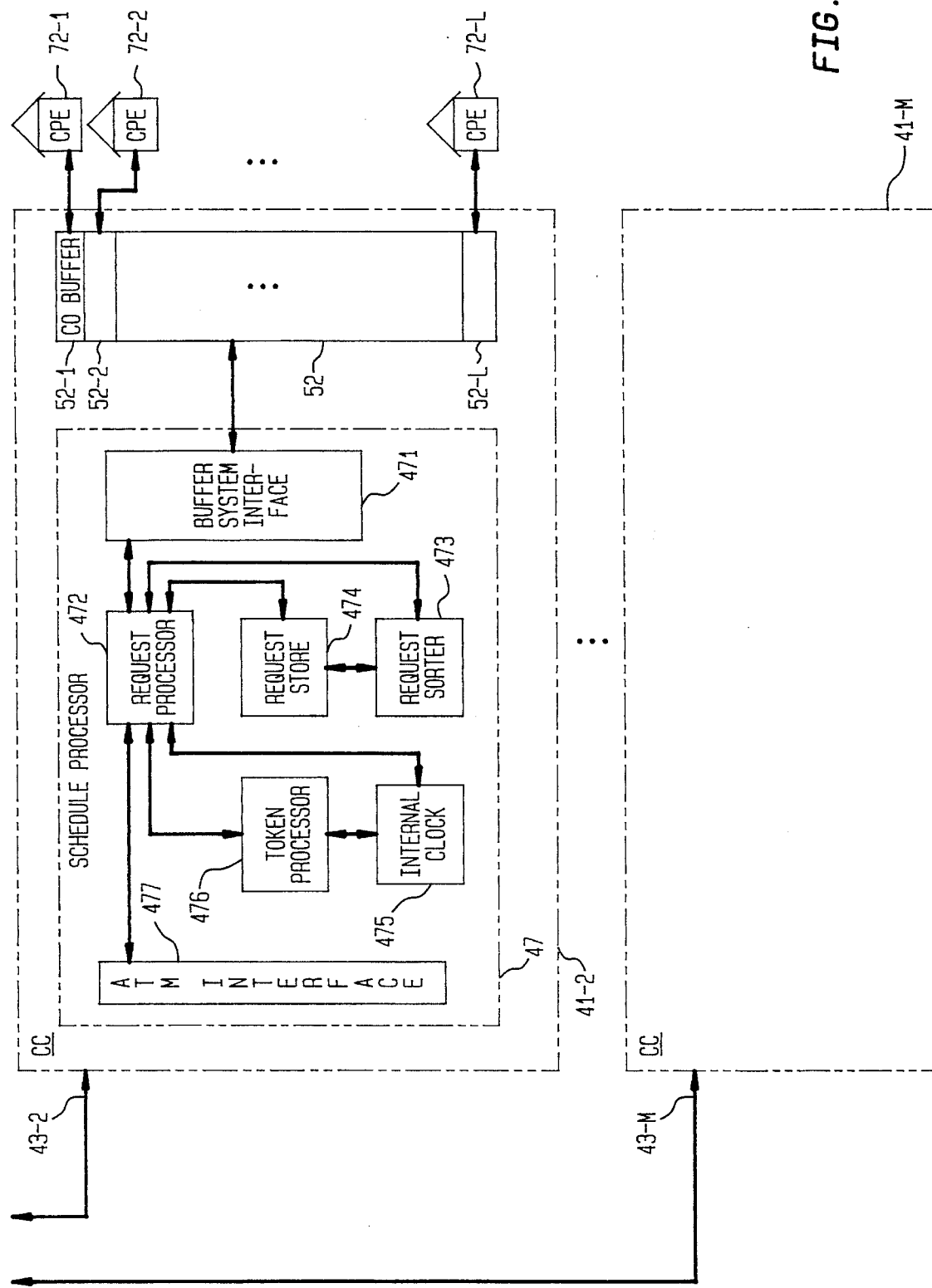

As shown in FIGS. 4 and 5, each CO cluster serves a plurality of CPEs. As depicted in FIG. 4, CO cluster 41-1 serves CPE 71-1 through 71-L. Each CO cluster comprises a CO buffer system which includes CO buffers 51-1 through 51-L. Each CPE may have a dedicated CO buffer solely for the subscriber's use, or a CO buffer may be dynamically allocated to the subscriber. For illustrative purposes, we assume that a CO buffer is designated to each CPE as depicted in FIG. 4.

Figure 12:
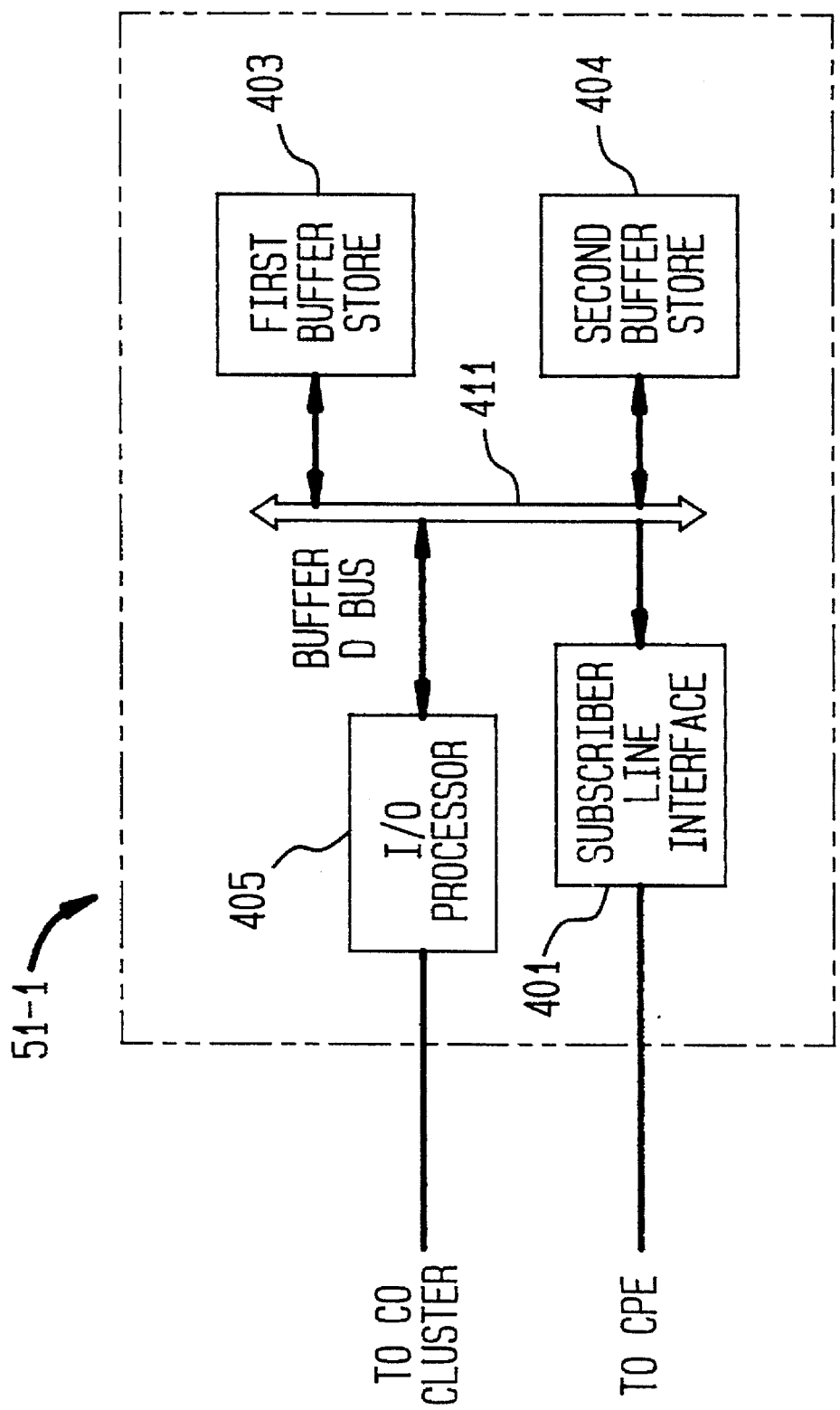
FIG. 12 shows a detailed illustrative embodiment of a CO buffer.

The detailed description of a CO buffer found in U.S. applications Ser. Nos. 07/884,516 and 07/884,515 is hereby incorporated by reference. As shown in FIG. 12, each CO buffer 51 contains dual buffer storage, which includes first and second buffer stores 403 and 404, respectively. Multimedia information received from the IWH to be played-out to the subscriber's CPE is stored in these buffer stores. The multimedia information is received and played-out from both buffer stores in a ping-pong (i.e. alternating) manner. Specifically, while multimedia information is being received via buffer data bus (DBUS) 411 at the first buffer store 403, multimedia information stored at the second buffer store 404 is being played-out to the subscriber's CPE via a subscriber line interface 401. When multimedia information is depleted from the second buffer store 404, the I/O processor 405 of the CO buffer causes multimedia information to be played-out from the first buffer store 403, and a request is sent to the appropriate IWH for additional multimedia information which is to be stored at the second buffer store 404.

The first and second buffer stores 403 and 404 each support $T_0$ seconds of play-out time of multimedia information to the subscriber's CPE. Therefore, to ensure that play-out of multimedia information to the subscriber is uninterrupted, a request generated on the depletion of the second buffer store 404 must be fulfilled within $T_0$ seconds. Otherwise, the subscriber's first buffer store 403 will also be depleted, thus resulting in customer "starvation" and an interruption in service. Thus, if a request for multimedia information is generated at time $t_{CC}$, the required Response Time (RT), which is the time by which a response to the request is due, is defined as shown in Eq. 1.

$$RT = t_{CC} + T_0 \quad (1)$$

A subscriber may also have interactive capabilities available at the CPE, such as fast forward and rewind, which capabilities, when selected, will cause the multimedia information currently held in the active buffer store to become obsolete. After such capabilities have been selected, sufficient time, $t_r$, must be allocated for requesting and receiving additional segments of the multimedia program and updating the CO buffers to reflect the subscriber's new position in the requested multimedia information. But, during this time, multimedia information is not being played out to the subscriber, so it is important that the time, $t_r$, is minimized to enhance subscriber satisfaction. Therefore, on receiving an interactive command that renders the multimedia information held in the buffer stores objective, the request, $r_i$, generated from the subscriber's CO buffer requires a RT defined as shown in Eq. 2.

$$RT = t_{CC} + t_r \quad (2)$$

In addition to a CO buffer system 51, each CO cluster (CC) includes a CC schedule processor 46, as shown in FIG. 4. The schedule processor 46 receives requests from the CO buffer system 51 and forwards these requests to the appropriate IWHs. The CC schedule processor 46 of FIG. 4 includes a request processor 462, a buffer system interface 461, a request store 464, a request sorter 463, an internal clock 465, an ATM interface 467, and a token processor 466. The CC schedule processor 46 is connected to the CO buffer system 51 via the buffer system interface 461, which supports communication between the CC schedule processor 46 and the CO buffers. Requests from the CO buffers for multimedia information received at the buffer system interface 461 are directed to the CC request processor 462. The request processor 462 forwards requests to appropriate IWHs via the ATM interface 467 and negotiates with the IWHs to establish schedules for transmitting requested multimedia information to the CO cluster such that collisions at the ATM switch 42 (see FIG. 6) are avoided and multimedia information is received at the requesting CO buffer in a timely manner.

Each request, $r_i$, received at the CC request processor 462 from CO buffers is held at request store 464 along with the following associated information:

$CB(r_i)$—The CO buffer generating the request, $r_i$;

$RT(r_i)$—The required response time of the request, $r_i$; and $IWH(r_i)$—The IWH to service the request, $r_i$.

The request store 464 is connected to the request sorter 463, which retrieves requests from request store 464, segregates the requests according to their associated IWH ($r_i$) and prioritizes requests from the most to least urgent based on the required RT ($r_i$) associated with each request. Preferably, only the most urgent request associated with each IWH is forwarded by the request processor 462 for servicing. A subsequent request is forwarded to each IWH from the request processor 462 after the preceding most-urgent request has been serviced.

The CC schedule processor 46 also includes an internal clock 465 which tracks the current time, $t_{CC}$, at the CO cluster and the time at which currently scheduled transmission to the CO cluster will be completed, which time is herein referred to as the end-of-transmission time, $t_{CC\text{-}ET}$. In forwarding a request to an IWH, the CC request processor includes the $t_{CC\text{-}ET}$ of the CO cluster as indicated by its internal clock 465. If the CO cluster is not involved currently in a transmission, its $t_{CC\text{-}ET}$ is $t_{CC}$. The CC schedule processor 46 also includes a CC token processor 466, which receives tokens from IWHs offering to transmit multimedia information to the CO cluster in response to a request. The CC token processor 466 is discussed further below.

Requests from CO clusters 41-1, 41-2, through 41-M are transmitted to the appropriate IWHs 10-1, 10-2, through 10-N via ATM switch 42. As shown in FIG. 6, IWH 1C)-1 includes an IWH schedule processor 11 and a multimedia memory or store 13. The IWH schedule processor 11 receives requests from the CO clusters and schedules transmission of the requested multimedia information to the CO clusters. The multimedia store 13 holds multimedia information to be transmitted to the CO clusters and played-out from the CO buffers to subscribers' CPEs. The IWH schedule processor 11 includes an IWH request processor 112, an IWH request store 114, an internal clock 115, an ATM interface 117, a return token store 118, and IWH token processor 116.

The IWH request processor negotiates with the CO clusters to establish a schedule for transmitting requested multimedia information to the CO clusters such that collisions are avoided and multimedia information is received at the requesting CO buffer in a timely manner. Requests from CO clusters are received at the IWH request processor 112 via the ATM interface 117 and stored at the IWH request store 114. Along with each request, the following information is also stored at the IWH request store 114:

$CC(r_i)$—the CO cluster sending the request, $r_i$;

$t_{CC\text{-}ET}$—the end-of-transmission time of the CO cluster sending the request; and $RT(r_i)$—The required response time of the request, $r_i$.

The IWH schedule processor 11 also includes an IWH internal clock 115 which functions similarly to the CC internal clock 465. The WH internal clock 115 is connected to the IWH request processor 112 and tracks the current time, $t_{IWH}$, at the IWH and the time at which currently scheduled transmission from the IWH will be completed, which time is herein referred to as the IWH end-of-transmission time, $t_{IWH\text{-}ET}$. In communicating with the CO clusters, the IWH includes its IWH-ET retrieved from its internal clock 115. If the IWH is not involved currently in a transmission, its $t_{IWH\text{-}ET}$ is $t_{IWH}$.

The IWH schedule processor 11 also includes an IWH token processor 116 for implementing a token passing scheme between the IWH and the requesting CO clusters. The IWH token processor 116 considers requests held at the IWH request store 114 and selects a request to be serviced. On selecting a request, the IWH token processor 116 generates a token to be issued to the CO cluster sending the request. This token represents an offer from the IWH to transmit the requested multimedia information after $t_{CC\text{-}ET}$ and $t_{IWH\text{-}ET}$, which ever time is later, i.e., after the IWH and CO cluster have both completed their currently scheduled transmissions.

The token is received at the CC token processor 466 of the CO cluster (See FIG. 4) and is considered along with tokens offered by other IWHs. The CC token processor 466 may decide to accept a token offered by an IWH or refuse the token by returning it to the sending IWH. A list of CO clusters returning tokens to an IWH are held at the return token store 118 (See FIG. 6). This list of CO clusters is maintained for the purpose of preventing the IWH token processor from repeatedly making offers to unavailable or disinterested CO clusters. A CO cluster may be removed from the token return list after a pre-determined period of time has lapsed or a new $t_{CC\text{-}ET}$ or a new request is sent from the CO cluster to the IWH.

In selecting a request to be serviced, the IWH token processor 116 may eliminate from its consideration those requests from CO clusters currently on its return token list at the return token store 118. In addition, the IWH token processor may employ other considerations for selecting a request to be serviced. For example, selection can be based solely on the urgency of the request, the request resulting in the smallest idle time, or some other criteria. Preferably, the IWH token processor may employ a distance function, $D_{IWH}$, to make a selection, which function is mathematically described in Eq. 3, $$D_{IWH}(r_i) = |t_{CC\text{-}ET} - t_{IWH\text{-}ET}| + RT(r_i)/R_0 \qquad (3)$$

where $$R_0 = T_0/t_0 \qquad (4)$$

$T_0$, as described above is the time for fulfilling a request to prevent buffer starvation, and to is the time for transmitting requested information. The CC token processor 466 may also implement a function for selecting a token for acceptance. In particular, the CC token processor 466 may also utilize a distance function, ($D_{CC}$), which is mathematically described in Eq. 5, to decide which token it should accept and which it should return.

$$D_{CC}(r_i) = t_{IWH\text{-}ET} + RT(r_i)/R_0 \qquad (5)$$

A request, $r_i$, having the smallest distance is highly considered for selection at the IWH token processor 116, and a token associated with a request, $r_i$, having the smallest distance is highly considered for selection at the CC token processor 466.

Distances functions, $D_{IWH}$ and $D_{CC}$, were generated after extensive experimentation with several distances functions, and these functions were found to result in the fewest RT ($r_i$) being missed. Both $D_{IWH}$ and $D_{CC}$ are linear combinations of two terms. The purpose of the first term of each distance function is to reduce idle time, and the purpose of the second part is to account for the urgency of the request. Through experimentation, $R_0$ was found to be the proper relative weight to balance the terms of the functions. The inclusion of both terms in the distance functions permits the IWH and CC token processors 116 and 466, respectively, to balance their objectives of minimizing idle time and providing a timely response to urgent requests.

In selecting a request for offering a token, the IWH token processor 116 may also take into account the availability of the requested multimedia information from the multimedia store 13 (See FIG. 6). The CO cluster may choose to decline a request if it determines that the time period for transmission will interfere with a subsequent transmission of multimedia information in response to a more urgent request.

In addition, a CC token processor may reject a token even after the token was previously accepted by the CC token processor, if a better offer (i.e., an offer of a token having a smaller $D_{CC}(r_i)$) is received and the current time ($t_{CC}$) at the CC cluster is earlier than the end-of-transmission time ($t_{IWH\text{-}ET}$) of the IWH which offered the previously accepted token. Rejecting a previously accepted token is referred to herein as divorcing which is accomplished by returning the previously-accepted token to the sending IWH.

Illustrative Example

To provide a more detailed discussion of an aspect of our inventive scheduling system and method, an illustrative embodiment is described below. As related to this illustrative example, FIGS. 4 and 5 depict CO clusters 41-1 and 41-2. CO cluster 41-1 is connected to CPEs 71-1, 71-2, and 71-L via CO buffers 51-1, 51-2 and 5 1-L, respectively, and CO cluster 41-2 is connected to CPEs 72° 1 and 72-2 via CO buffers 52-1 and 52-2, respectively. CO clusters 41-1 and 41-2 are connected to IWHs 10-1 and 10-2 via ATM switch 42. FIGS. 4 and 5 depict a detailed diagram of the CC schedule processors 46 and. 47 of CO clusters 41-1 and 42-2, respectively. FIGS. 6 and 7 depict a detailed diagram of the IWH schedule processors 11 and 12 of IWH 10-1 and 10-2, respectively, and FIGS. 13(a) and 13(b) provide a flow diagram of our scheduling method 600.

Figure 13A:
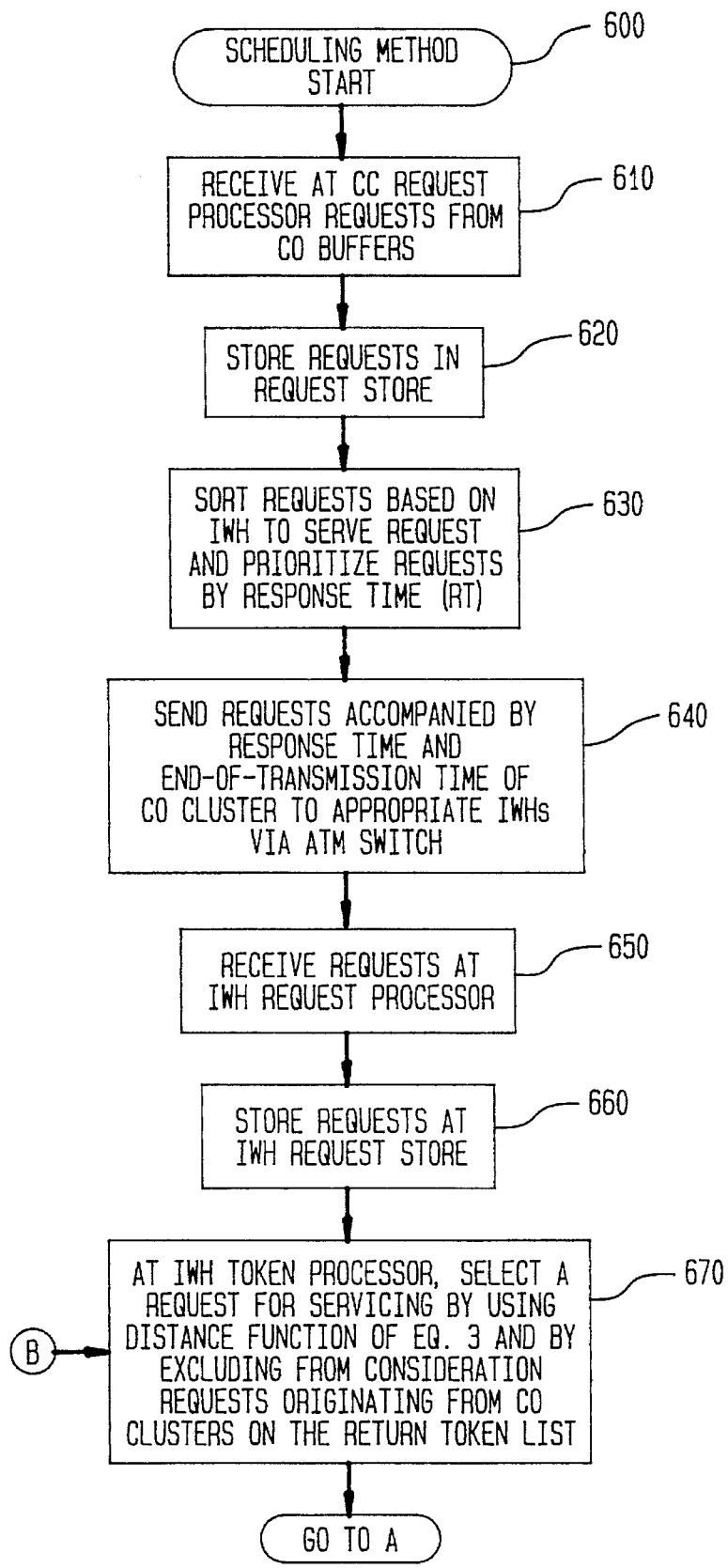
FIGS. 13(a) and 13(b) depict a flow diagram of our inventive scheduling method, in accordance with an illustrative embodiment of our invention.
Figure 13B:
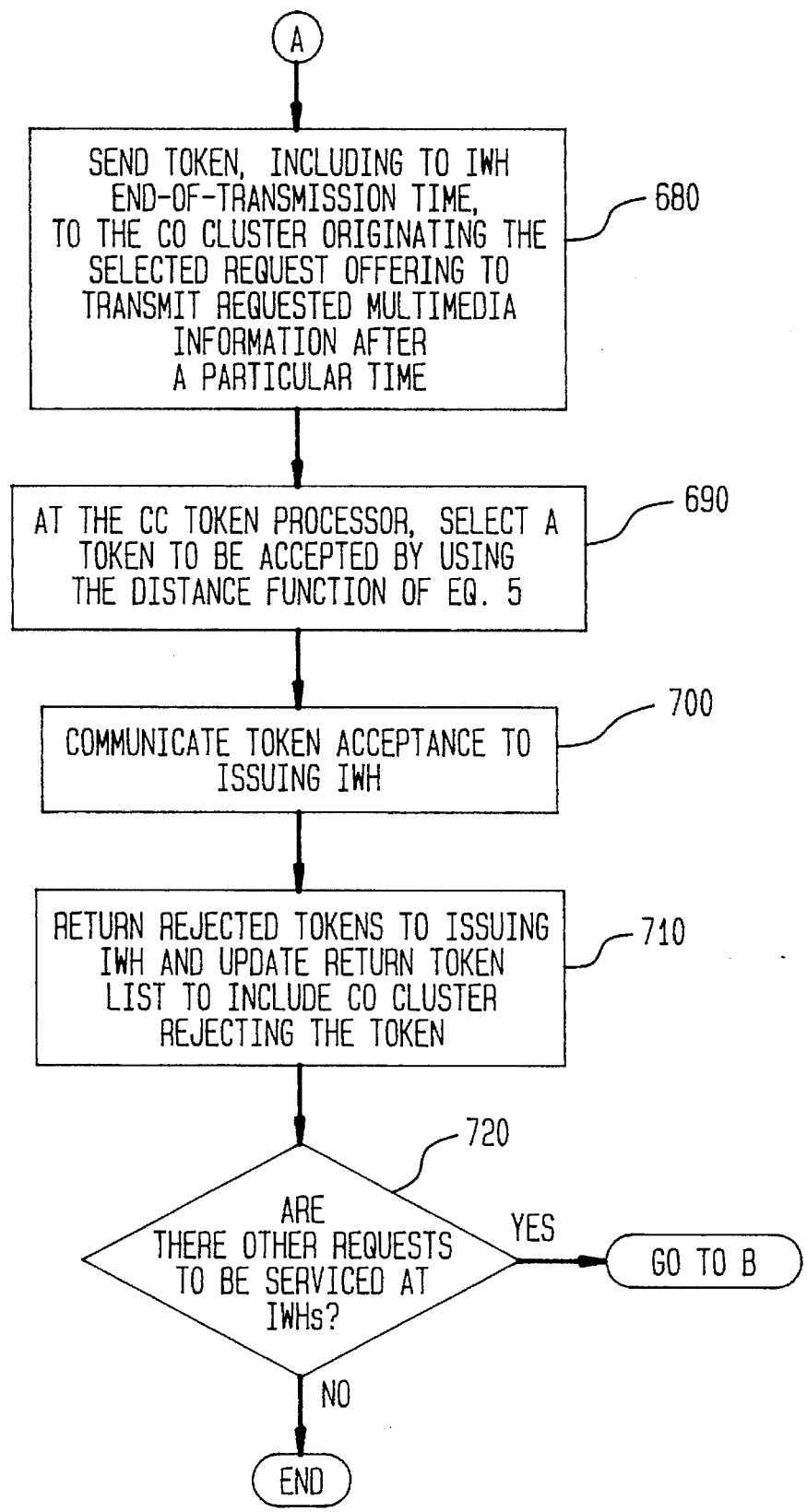

FIG. 8(a) depicts, in tabular form, requests and associated information received at the request processor 462 (Step 610 of FIG. 13(a)) and stored in the request store 464 (Step 620) of CO cluster 41-1. Furthermore, FIG. 8(b) depicts, in tabular form, requests and associated information received at the request processor 472 and stored in the request store 464 associated with CO cluster 41-2. Specifically, FIG. 8(a) shows that request $r_1$ is originated from CO buffer 51-1 (i.e., CB ($r_1$) is CO buffer 51-1 ), which corresponds to CPE 71-1 and has a response time (RT ($r_1$)) of $2TR_0$. Furthermore, the IWH to service request $r_i$ (IWH ($r_1$)) is IWH 10-1. Request $r_2$ originated from CO buffer 51-2 (i.e., CB($r_2$) is CO buffer 51-2), which is associated with CPE 71-2 and has a RT($r_2$) of $TR_0$. The IWH to fulfill request $r_2$ (IWH ($r_2$)) is IWH 10-2. Similarly, request $r_3$ is received at CO cluster 41-1, and, as shown in FIG. 8(b), requests $r_4$ and $r_5$ are received at CO cluster 41-2. It should be noted that the assigned values of RT ($r_i$) shown in FIGS. 8(a) and 8(b) are intended to be illustrative only and were selected to simplify discussion of our invention.

Requests $r_1$, $r_2$, and $r_3$, which are stored in the request store 464, are retrieved by the request sorter 463 of CO cluster 41-1. The request sorter 463 segregates these requests according to their associated IWH($r_i$) and prioritizes the requests from the most to the least urgent based on the RT ($r_i$) associated with each request (Step 630). Therefore, request sorter 463 groups requests $r_1$ and $r_3$, which are to be serviced by IWH 10-1, separate from request $r_2$, which is to be serviced by IWH 10-2. Furthermore, the request sorter 463 assigns a higher priority to $r_3$ than $r_1$ since $r_3$ has a smaller required response time (RT ($r_3$)=$TR_0$), and therefore is more urgent than request $r_1$ (RT($r_1$)=$2TR_0$). The request sorter 473 of CO cluster 41-2 separates request $r_4$, which is to be serviced by IWH 10-2, from request $r_5$, which is to be serviced by IWH 10-1.

The request processors 462 and 472 of CO clusters 41-1 and 41-2 each forwards the most urgent request destined for each IWH along with their associated RT($r_i$) to the appropriate IWH via leads 43-1 and 43-2, respectively, of the ATM switch 42 (Step 640). Therefore, request $r_3$, which is to be serviced by IWH 10-1, and $r_2$, which is to be serviced by IWH 10-2, are transmitted from request processor 462, and requests $r_4$, which is to be serviced by IWH 10-2, and request $r_5$, which is to be serviced by IWH 10-1, are transmitted from request processor 472. Since request $r_1$ is less urgent than request $r_3$, request $r_1$ will be transmitted after request $r_3$ has been serviced by IWH 10-1. Along with each request, the request processor sends its end-of-transmission time, $t_{CC-ET}$, which is tracked by internal clocks 465 and 475 at the CO clusters 41-1 and 41-2, respectively (Step 640). For illustrative purposes, it is assumed that $t_{CC-ET}=2T$ for both CO clusters 41-1 and 41-2 (see FIGS. 9(a) and 9(b)).

Figure 9A:
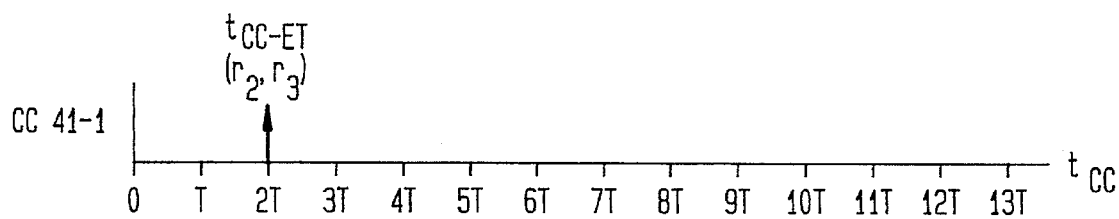
FIGS. 9(a)–9(d) display the current time at CO clusters and IWHs in accordance with an illustrative example of our invention.
Figure 9B:
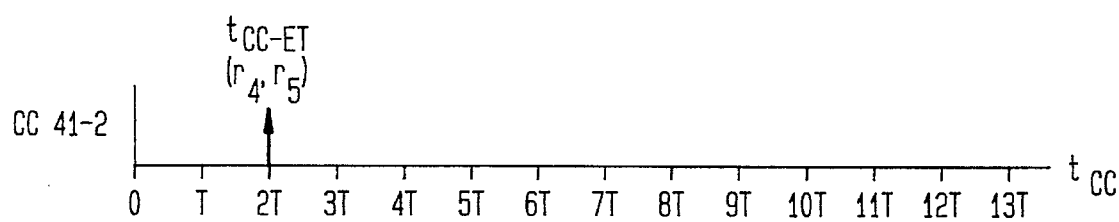

As illustratively shown in FIG. 9(a), we assume that CO cluster 41-1 transmits to IWH 10-1 request $r_3$ along with $t_{CC-ET}=2T$. We also assume that CO cluster 41-1 transmits to IWH 10-2 request $r_2$ along with $t_{CC-ET}=2T$. Furthermore, as shown in FIG. 9(b), CO cluster 41-2 transmits to IWH 10-2 request $r_4$ along with $t_{CC-ET}=2T$ and to IWH 10-1 request $r_5$ with a $t_{CC-ET}=2T$. It should be noted that our illustrative example represents a static embodiment of our scheduling method, where the requests are received at their corresponding IWH by time, $t_{IWH}=0$. In practice, requests may arrive and be processed dynamically.

Requests $r_3$ and $r_5$ and associated information are received at the IWH request processor 112 (Step 650) and stored at the IWH request store 114 of IWH 10-1 as shown in FIG. 6 (Step 660). Requests $r_2$ and $r_4$ are received at the request processor 122 and stored at the request store 124 of IWH 10-2. FIGS. 10(a) and 10(b) depict the requests and associated information stored in the request stores 114 and 124 of the IWH 10-1 and 10-2, respectively. Illustratively, for request $r_3$, the request store 114 holds the identity of the CO cluster sending the request (CC ($r_i$)), which is CO cluster 41-1, the response time of the request (RT ($r_i$)), which is $TR_0$, and the end-of-transmission time ($t_{CC-ET}(r_i)$) associated with the request, which is 2T. Associated information is similarly held at the request stores 114 and 124 of IWHs 10-1 and 10-2, respectively, for each request.

Based on the requests held in the IWH request stores 114 and 124, the token processors 116 and 126 at IWHs 10-1 and 10-2 each selects a request to be serviced (Step 670). A request is selected based on distance function, $D_{IWH}(r_i)$, which is mathematically described in Eq. 3 (Step 670). For each request, the distance function is computed, and the request generating the smallest distance is selected. Assuming that the end-of-transmission time, $t_{IWH-ET}$, reported by the internal clocks 115 and 125 of the IWHs 10-1 and 10-2 is 3T and 4T, respectively, the distances computed for requests $r_3$ and $r_5$ and requests $r_2$ and $r_4$ are as shown in FIGS. 10(c) and 10(d), respectively. Since $r_3$ yields a smaller distance than $r_5$ and assuming that the return token store 118 is currently empty, the token processor 116 of IWH 10-1 will cause token A-1 to be sent to CO cluster 41-1 offering to transmit the multimedia information requested in request $r_3$ (See FIG. 9c). Similarly, since request $r_2$ yields a smaller distance than request $r_4$, and assuming that the return token store 128 is currently empty, the token processor 126 of IWH 10-2 will cause token B-1 to be also sent to CO cluster 41-1.

It should be noted that under prior communications networks employing ATM switches, on detecting that CO cluster 41-1 was available for receiving transmission, both IWHs 10-1 and 10-2 would have transmitted their requested information without any prior negotiation with the CO cluster, thus making collisions at port 43-1 of the ATM switch 42 imminent. However, our invention obviates such collisions by implementing a scheduling system and method, which employ a token passing scheme to avoid collisions and maximize timely responses to requests.

Tokens A-1 and the associated $t_{IWH-ET}$ from IWH 10-1 and token B-1 and the associated $t_{IWH-ET}$ from IWH 10-2 are both transmitted via the ATM switch 42 to CO cluster 41-1 (Step 680 of FIG. 13(b)). These tokens are received at the CC request processor 462 and passed to the token processor 466 of the CO cluster 41-1 (See FIG. 4). The token processor 466 decides which token should be accepted and which should be refused by employing the distance function, $D_{CC}(r_i)$, which is mathematically described in Eq. 5 (Step 690). FIG. 11(a) displays, in tabular form, the distances generated for requests $r_3$ and $r_2$. Since request $r_3$ has a smaller distance than request $r_2$, the token processor 466 causes token A-1 to be accepted and token B-1 to be rejected. In accepting token A-1, the request processor 462 of CO cluster 41-1 will forward a message to IWH 10-1 conveying its acceptance (Step 700). IWH 10-1 then retrieves the requested multimedia information from multimedia memory 13 and transmits it to CO cluster 41-1 starting at time 3T. The request processor 462 at CO cluster 41-1 then forwards the requested multimedia information to CO buffer 51-L, which plays out the multimedia information to the CPE 71-L. Furthermore, the request processor 462 may forward request $r_1$ to IWH 10-1 to be serviced at some time after request $r_3$ has been serviced. To refuse token B-1, the request processor 462 at CO cluster 41-1 returns the token to 1WH 10-2 (Step 710). On receiving the returned token, the request processor 122 at IWH 10-2 updates the return token store 124 to reflect the refusal of CO cluster 41-1 to accept token B-1 (See FIG. 7 and Step 710 of FIG. 13(b)).

Figure 9C:
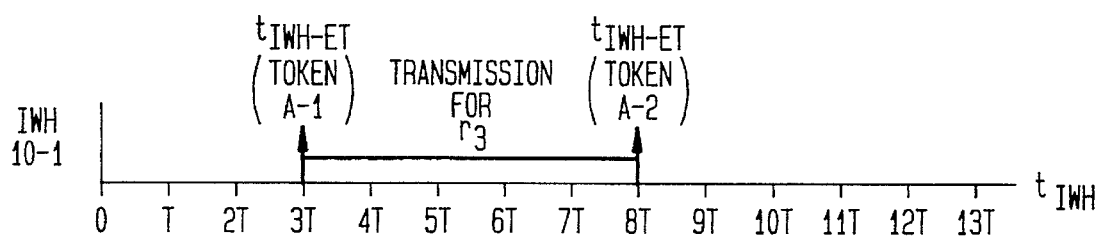
Figure 9D:
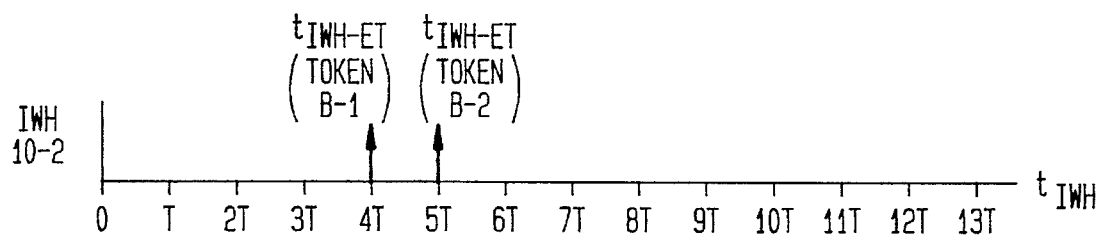

Since the token offered by IWH 10-1 has been accepted and transmission of the requested information has been scheduled, IWH 10-1 is free to offer another token A-2 to service another request (Steps 720 and 680). Similarly, since token B-1 was returned to IWH 10-2, it is free to offer another token B-2 to service other requests (Steps 720 and 680). Therefore, at IWH 10-1, the token processor 116 computes distances for requests held in the request store 114 using distance function $D_{IWH}(r_i)$ of Eq. 4 and applying a new end-of-transmission time, $t_{IWH-ET}$. The new $t_{IWH-ET}$ associated with IWH 10-1 is the time at which transmission for $r_3$ will be completed, which time is shown in FIG. 9(c) to be 8T. Assuming that the current time at IWH 10-2 is 5T, which is later than its actual end-of-transmission time of 4T, the new end-of-transmission time assigned at IWH 10-2 is 5T. Similarly, IWH 10-2 computes distances for requests based on a new end-of-transmission time, IWH-ET of 5T, as shown in FIG. 9(d).

Assuming for illustrative purposes that no additional requests have been received at IWH 10-1 since the last request selection, request $r_5$ is selected at the token processor 116, causing token A-2 to be offered to CO cluster 41-2 with $t_{IWH-ET}=8T$, as shown in FIG. 10(e). Assuming for illustrative purposes that no additional requests have been received at IWH 10-2 since the selection of request $r_2$, requests $r_2$ and $r_4$ are considered for selection. As shown in FIG. 10(f), request $r_2$ yields a distance smaller than request $r_4$, thus making request $r_2$ a high contender for selection at the token processor 126 of IWH 10-2. However, it may not be necessary to calculate distances to make a selection between requests $r_2$ and $r_4$ since the token processor 126 also considers the list of CO clusters refusing tokens offered by IWH 10-2, which list is held at the return token store 128. Since CO cluster 41-1 recently refused token B-1 offered by IWH 10-2 and is listed in the return token store 128, CO cluster 41-1 is ineligible to receive token B-2. Therefore, request $r_4$ is selected at the token processor 126 of IWH 10-2, and token B-2 is offered to CO cluster 41-2, which sent request $r_4$.

CO cluster 41-2 receives tokens A-2 and B-2 from IWHs 10-1 and 10-2, respectively. By computing the distances associated with each request based on distance function $D_{CC}(r_i)$ of Eq. 5, request $r_4$ associated with token B-2 has a smaller distance than request $r_5$, as shown in FIG. 11(b). Therefore, the token processor 476 at CO cluster 41-2 accepts token B-2 and multimedia information requested by request $r_4$ is subsequently transmitted to CO cluster 41-2 starting at time 5T. The requested information is then forwarded from the request processor 472 of CO cluster 41-2 to CO buffer 52-1, which plays out the multimedia information to CPE 72-1.

CO cluster 41-2 also rejects token A-2 by returning this token to IWH 10-1. CO cluster 41-2 is then listed in the return token store 118 of IWH 10-1. CO cluster 41-2 may be removed from the return token list after a pre-determined amount of time has expired, when another request is received at IWH 10-1 from CO cluster 41-2, or when a new end-of-transmission time is received from CO cluster 41-2. The IWHs and CO clusters will continually receive other requests for multimedia information, and similar processing will be conducted to schedule transmission between the IWHs and CO clusters in response to the requests.

Figure 1:
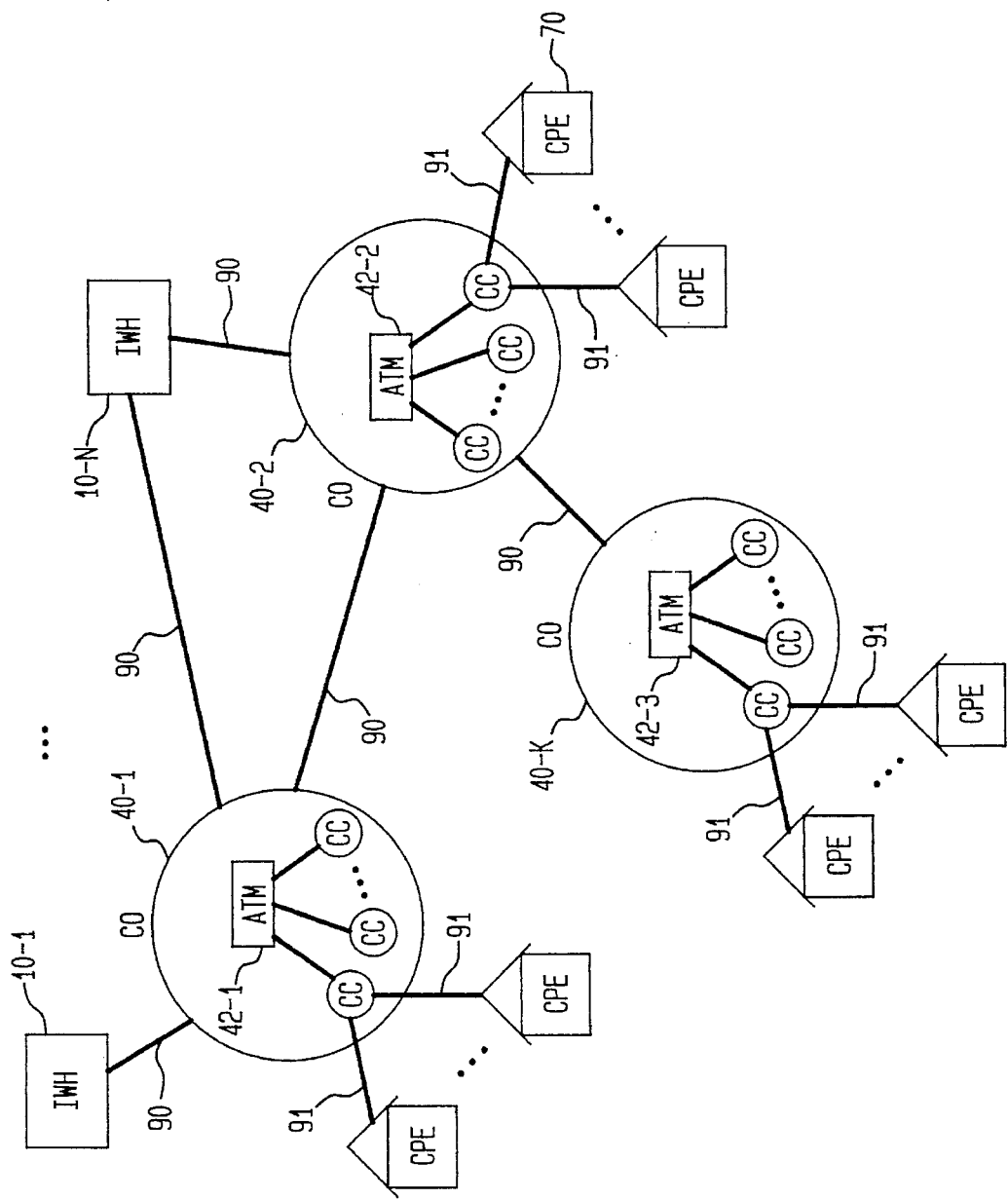
FIG. 1 depicts a communications network which employs the Broadband Integrated Services Digital Network (BISDN) for providing interconnectivity between network nodes.
Figure 2:
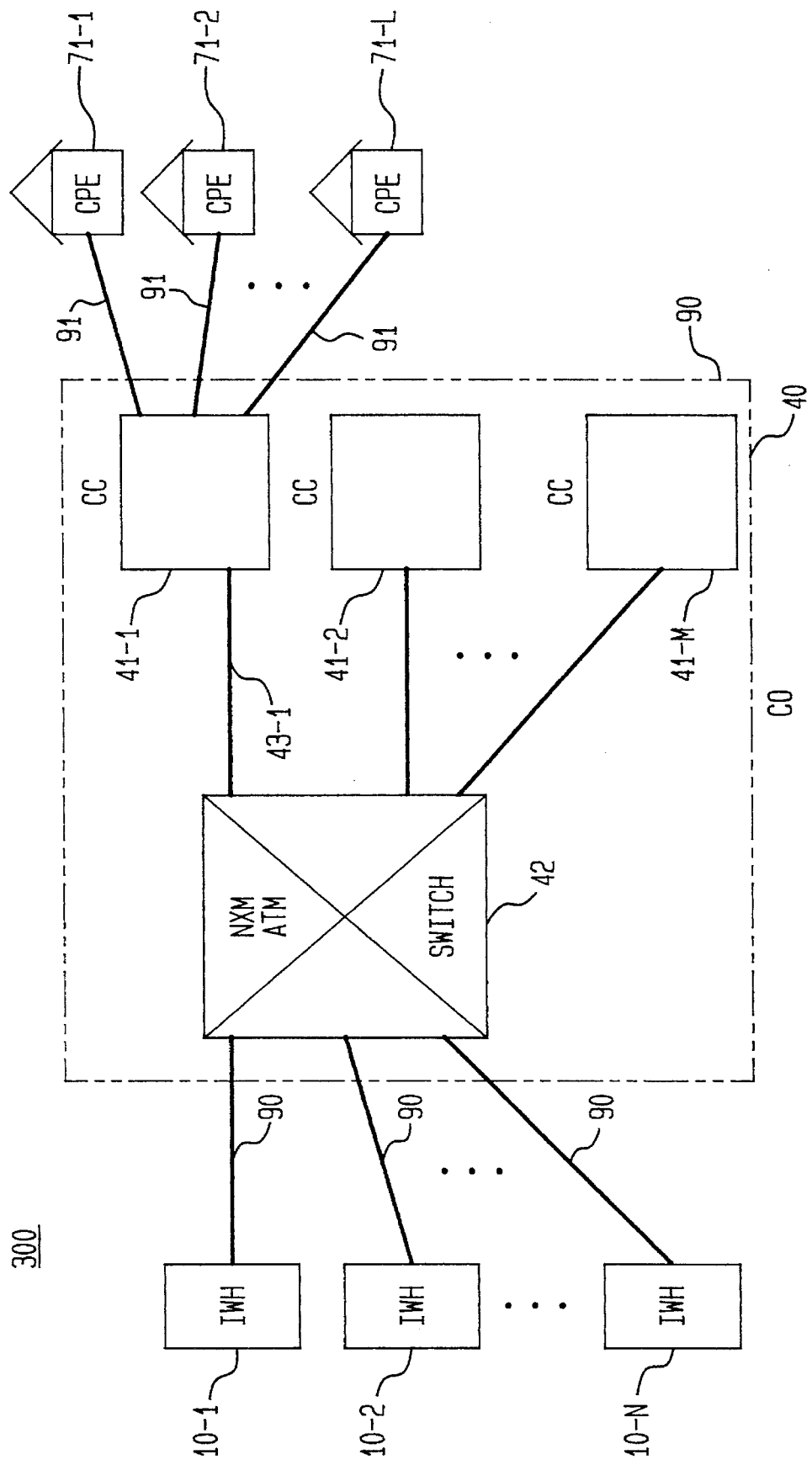
FIG. 2 depicts a communications network which includes a plurality of Information Warehouses (IWHs), a Central Office (CO), which includes an ATM switch and a plurality of CO clusters, and a plurality of Customer Premises Equipment (CPEs).
Figure 14:
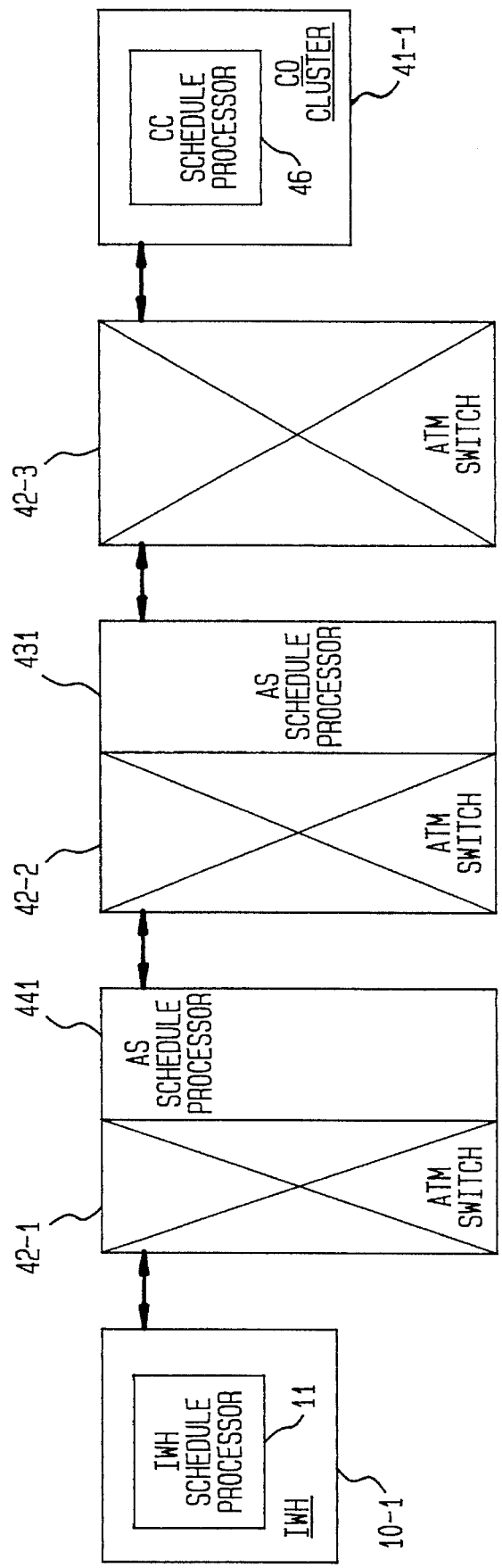
FIG. 14 depicts our scheduling processors, in cascade, for scheduling transmission between an IWH and CO cluster separated by multiple ATM switches.

Requests from CO clusters may not be routed directly to an IWH via a single ATM switch, but could be routed through multiple ATM switches. As shown in FIG. 1, CO clusters at CO 40-K receiving requests for IWH 10-1 are interconnected to IWH 10-1 via ATM switch 42-3 at CO 40-K, ATM switch 42-2 at CO 40-2, and ATM switch 42-1 at CO 40-1. Therefore, requested information transmitted from 1WH 10-1 could be involved in a collision at an output port at any of the ATM switches in the path between IWH 10-1 and the CO clusters of CO 40-K. To avoid collisions and ensure that requested multimedia information is received at the requesting CO clusters in a timely manner, our scheduling system and method may be employed in cascaded form as shown in FIG. 14. IWH 10-1 includes an IWH schedule processor 11 as shown in FIG. 6, and CO cluster 41-1 includes a CC schedule processor 46 as shown in FIG. 4. ATM switches 42-3, 42-2, and 42-1 are conventional ATM switches which route data from point-to-point between network nodes in self-contained, fixed-length data packets. In addition, ATM switches 42-1 and 42-2 are associated with schedule processors 441 and 431, respectively.

AS schedule processor 431 associated with ATM switch 42-2 negotiates a schedule with CC schedule processor 46 for transmitting multimedia information through ATM switch 42-3 to CO cluster 41-1. AS schedule processor 441 associated with ATM switch 42-1 negotiates a schedule with AS schedule processor 431 for transmitting multimedia information through ATM switch 42-2. AS schedule processor 441 also negotiates a schedule with IWH schedule processor 11 for transmitting multimedia information from 1WH 10-1 through ATM switch 42-1.

Figure 15:
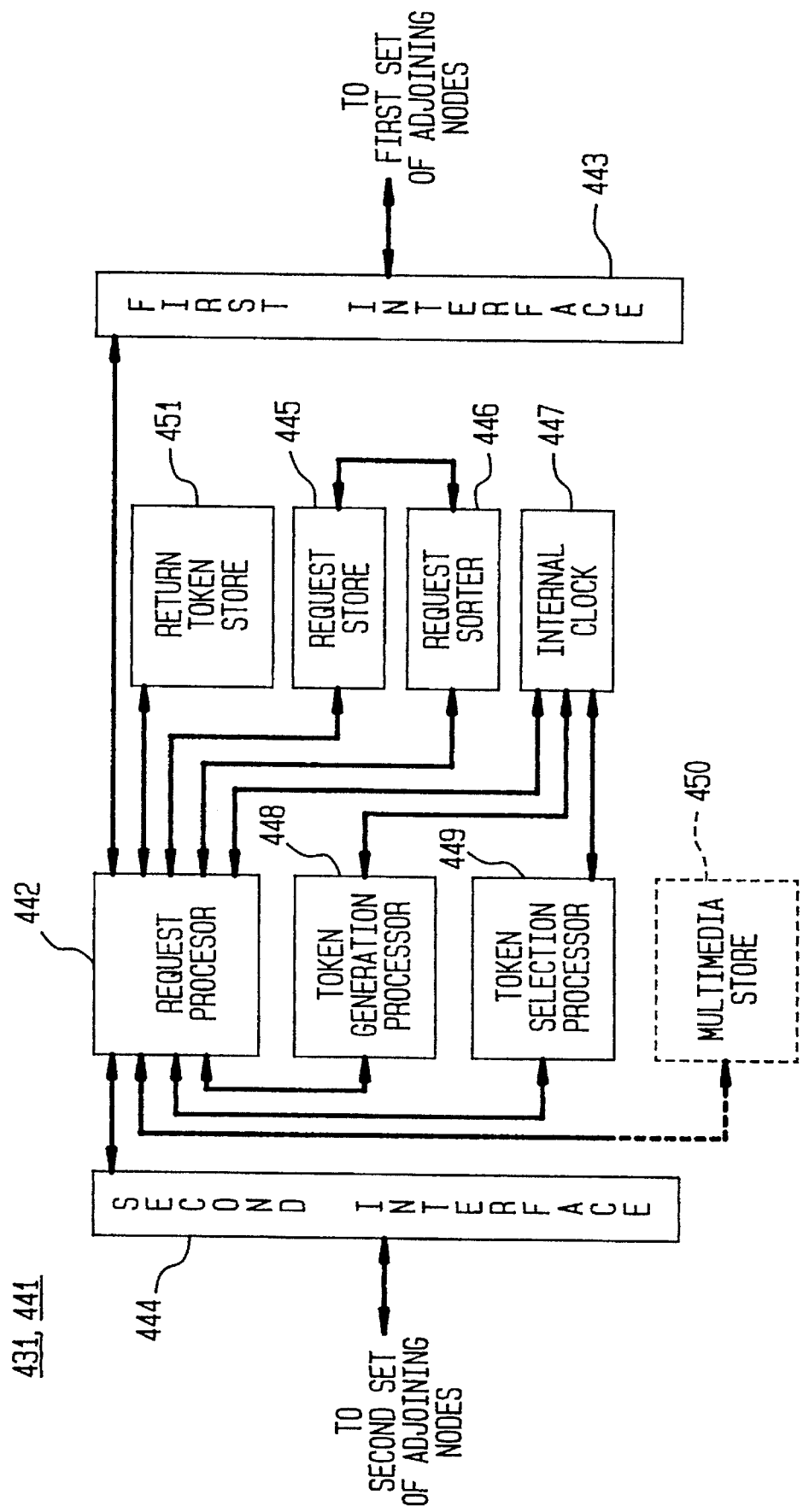
FIG. 15 provides a detailed schematic diagram of the schedule processors associated with ATM switches of FIG. 15 in accordance with an illustrative embodiment of our invention.

An illustrative embodiment of AS schedule processor 441 and 431 is shown in FIG. 15. The AS schedule processor includes a request processor 442, which receives, directly or indirectly, requests from a first set of adjoining nodes and forwards these requests to a second set of adjoining nodes. For an AS schedule processor, a first set of adjoining nodes could include AS schedule processors and CC schedule processors which are connected to the AS schedule processor via ATM switches and which forward to it requests to be serviced. The second set of adjoining nodes could include other AS schedule processors or IWH schedule processors which are connected to the AS schedule processor via ATM switches and which receive from it requests to be serviced.

The AS schedule processor is connected to the first set of adjoining nodes via a first interface 443 and to the second set of adjoining nodes via a second interface 444. Requests received from the first set of adjoining nodes at the first interface 443 are directed to the request processor 442, which forwards requests to the second set of adjoining nodes and negotiates with the second set to establish schedules for transmitting requested multimedia information for the first set of adjoining nodes such that collisions at the ATM switch are avoided and multimedia information is received at the first set of adjoining nodes in a timely manner. The request processor 442 performs the functions of CC request processor 462 of FIG. 4 and IWH request processor 112 of FIG. 6 in that it receives tokens from the second set of adjoining nodes and receives requests from the first set of adjoining nodes.

The AS schedule processor also includes a request store 445 for holding requests received from the first set of adjoining nodes. Requests held at request store 445 which are to be forwarded to the second set of adjoining nodes are sorted at request sorter 446 which functions similar to request sorter 463 of FIG. 4. AS schedule processor also includes an internal clock 446 which tracks the current time at the ATM switch and its end-of-transmission time, similar to internal clock 465 of FIG. 4 and internal clock 115 of FIG. 6.

When requested multimedia information is available at multimedia store 450, the token generation processor 448, which is akin to the IWH token processor 116 of FIG. 6, selects a request to be serviced. On selecting a request, the token generation processor 448 issues a token to be sent to the node of the first set of adjoining nodes sending the selected request. The return token store 451 keeps a list of nodes in the first set of adjoining nodes which reject tokens issued from the token generation processor 448. The token selection processor 449 functions similarly to CC token processor 466 of FIG. 4 and decides which tokens offered by nodes of the second set of adjoining nodes should be accepted and which should be rejected.

The implementation of our scheduling method in the embodiment depicted in FIG. 14 can be best described by considering the operation of each schedule processor with respect to adjacent schedule processors in view of the previously described illustrative example. With respect to CC schedule processor 46 of CO cluster 41-1, AS schedule processor 431 functions similar to IWH schedule processor 11 of IWH 10-1 (see FIG. 6). With respect to AS schedule processor 441, AS schedule processor 431 functions similar to CC schedule processor 46 of CO cluster 41-1 (see FIG. 4). With respect to AS schedule processor 431, AS schedule processor 441 functions similar to IWH schedule processor 11 of IWH 10-1 (see FIG. 6). With respect to the IWH schedule processor 11 of IWH 10-1, AS schedule processor 441 functions similar to CC schedule processor 46 of CO cluster 41-1 (see FIG. 4).

CONCLUSION

We have disclosed a system and method for scheduling multimedia information between nodes interconnected by an ATM switch. More specifically, we have disclosed a system and method for scheduling transmission between IWHs and CO clusters interconnected by an ATM switch such that collisions at the ATM switch are avoided and multimedia information requested from IWHs is received at the requesting CO clusters in a timely manner. Finally, the above-described embodiments of the invention are intended to be illustrative only. Numerous alternative embodiments of the present invention may be devised without departure from the spirit and scope of the following claims.

What is claimed is:

1. A system for scheduling transmission of multimedia information from a first set of nodes as requested by subscribers at a second set of nodes, wherein said first and second sets of nodes are interconnected by an ATM switch, such that collisions at said ATM switch are avoided and requests are serviced in a timely manner, said system comprising:

at each node of said first set, a first schedule processor which includes a first request processor connected to a first token processor, said first request processor receiving requests for multimedia information from nodes of said second set and said first token processor selecting a request from among said requests and issuing a token to the node of said second set which sent said selected request together with a first end of transmission time $(t_1)$, and at each node in said second set, a second schedule processor which includes a second request processor connected to a second token processor, said second request processor receiving requests for multimedia information from subscribers, wherein each of said received requests includes a response time (RT), and sending at least one of said received requests to one of said nodes of said first set together with a second end of transmission time $(t_2)$, and said second token processor receiving tokens issued from said first token processors at nodes of said first set, selecting one of said tokens for acceptance, causing a message of acceptance to be sent to the node of said first set issuing said selected token, rejecting other of said tokens and returning said rejected tokens to nodes of said first set issuing said rejected tokens; and wherein said first schedule processor further includes a return token store for holding a list of nodes of said second set rejecting tokens issued by said first token processor and means responsive to said list of nodes held at said return token store for performing a request selection using a distance function which minimizes idle time at said first schedule processor and missed response times of requests, said distance function $(D_1)$ being $$D_1 = |t_1 - t_2| + RT/R_0$$

wherein $$R_0 = T_0/t_0,$$

$T_0$ being a time for servicing each request to prevent the requesting subscriber from being without multimedia information and $t_0$ being a time for transmitting requested multimedia information.

2. The system of claim 1 for scheduling transmission of multimedia information, wherein said first and second schedule processors include first and second internal clocks, respectively, for tracking said first and second end-of-transmission times, $t_1$ and $t_2$, respectively, at said first and second request processors, respectively.

3. A system for scheduling transmission of multimedia information from a first set of nodes as requested by subscribers at a second set of nodes, wherein said first and second sets of nodes are interconnected by an ATM switch, such that collisions at said ATM switch are avoided and requests are serviced in a timely manner, said system comprising:

at each node of said first set, a first schedule processor which includes a first request processor connected to a first token processor, said first request processor receiving requests for multimedia information from nodes of said second set and said first token processor selecting a request from among said requests and issuing a token to the node of said second set which sent said selected request together with a first end of transmission time ($t_1$);

at each node in said second set, a second schedule processor which includes a second request processor connected to a second token processor, said second request processor receiving requests for multimedia information from subscribers, wherein each of said received requests includes a response time (RT), and sending at least one of said received requests to one of said nodes of said first set, and said second token processor receiving tokens issued from said first token processors at nodes of said first set, selecting one of said tokens for acceptance, causing a message of acceptance to be sent to the node of said first set issuing said selected token, and rejecting other of said tokens; and wherein said second token processor performs token selection using a distance function which minimizes idle time at said second schedule processor and missed response times of requests, said distance function ($D_2$) being $$D_2 = t_1 + RT/R_0$$

wherein $$R_0 = T_0/t_0,$$

$T_0$ being the time for servicing each request to prevent the requesting subscriber from being without multimedia information and $t_0$ being the time for transmitting requested multimedia information.

4. A method of scheduling transmission of multimedia information from a first set of nodes as requested by subscribers at a second set of nodes, wherein said first and second sets of nodes are interconnected by an ATM switch, such that collisions at said ATM switch are avoided and requests for multimedia information are serviced in a timely manner, said method comprising the steps of:

at each node of said second set,
receiving requests for multimedia information from subscribers, which requests each includes a response time (RT) and
sending at least one of said received requests to one of said nodes of said second set with a second end of transmission time ($t_2$); and at each node of said first set,
receiving said requests for multimedia information sent from nodes of second set based on said RT of each request,
issuing a token to the node of said second set which sent said selected request, and
sending with said token a first end-of-transmission time ($t_1$); and at each said node of said second set,
receiving tokens issued from nodes of said first set,
selecting one of said tokens for acceptance, said selecting including computing for each of said tokens a distance using a distance function ($D_1$) which minimizes idle time at nodes of said second set and missed response times of requests, said distance function being $$D_1 = |t_1 - t_2| + RT/R_0$$

and wherein $$R_0 = T_0/t_0,$$

$T_0$ being the time for servicing each request to prevent the requesting subscriber from being without multimedia information and $t_0$ being the time for transmitting requested multimedia information; and causing a message of acceptance to be sent to the node of said first set issuing said selected token.

5. The method of claim 4 of scheduling transmission of multimedia information further including the steps of returning said rejected tokens from nodes of said second set to nodes of said first set issuing said rejected tokens and holding at a return token store at nodes of said first set a list of nodes of said second set rejecting issued tokens.

6. A method of scheduling transmission of multimedia information from a first set of nodes as requested by subscribers at a second set of nodes, wherein said first and second sets of nodes are interconnected by an ATM switch, such that collisions at said ATM switch are avoided and requests for multimedia information are serviced in a timely manner, said method comprising the steps of:

at each node of said second set,
receiving requests for multimedia information from subscribers, which requests each includes a response time (RT) and
sending at least one of said received requests to one of said nodes of said first set; and at each node of said first set,
receiving said requests for multimedia information sent from nodes of second set based on said RT of each request,
issuing a token to the node of said second set which sent said selected request, and
sending with said token a first end-of-transmission time ($t_1$); and at each said node of said second set,
receiving tokens issued from nodes of said first set,
selecting one of said tokens for acceptance, said selecting including computing for each of said tokens a distance using a distance function ($D_2$) which minimizes idle time at nodes of said second set and missed response times of requests, said distance function being $$D_2 = t_1 + RT/R_0$$

and wherein $$R_0 = T_0/t_0,$$

$T_0$ being the time for servicing each request to prevent the requesting subscriber from being without multimedia information and $t_0$ being the time for transmitting requested multimedia information; and causing a message of acceptance to be sent to the node of said first set issuing said selected token.

* * * * *